(12) United States Patent
Villanueva et al.

(10) Patent No.: US 10,106,971 B2
(45) Date of Patent: Oct. 23, 2018

(54) TILT DIVERTER TO CONTROL STORM-WATER

(71) Applicants: Arturo J. Villanueva, Wilmington, CA (US); Arturo N. Villanueva, Jr., San Diego, CA (US); Vernon N. Villanueva, Lakewood, CA (US)

(72) Inventors: Arturo J. Villanueva, Wilmington, CA (US); Arturo N. Villanueva, Jr., San Diego, CA (US); Vernon N. Villanueva, Lakewood, CA (US)

(*) Notice: Subject to any disclaimer, the term of this patent is extended or adjusted under 35 U.S.C. 154(b) by 0 days.

(21) Appl. No.: 15/433,026

(22) Filed: Feb. 15, 2017

(65) Prior Publication Data
US 2018/0230687 A1    Aug. 16, 2018

(51) Int. Cl.
E03F 5/10    (2006.01)
E03F 1/00    (2006.01)
E03F 5/06    (2006.01)

(52) U.S. Cl.
CPC ............. *E03F 5/107* (2013.01); *E03F 1/002* (2013.01); *E03F 1/003* (2013.01); *E03F 5/06* (2013.01); *E03F 5/10* (2013.01); *E03F 2201/10* (2013.01)

(58) Field of Classification Search
CPC ... E03F 5/107; E03F 1/002; E03F 5/06; E03F 5/10
See application file for complete search history.

(56) References Cited

U.S. PATENT DOCUMENTS

| 41,753 | A | * | 3/1864 | Beach | F16K 31/26 137/122 |
|---|---|---|---|---|---|
| 72,298 | A | * | 12/1867 | Hudson et al. | F16K 31/26 137/122 |
| 549,835 | A | * | 11/1895 | Van Benthuysen | E04D 13/08 137/120 |
| 649,838 | A | * | 5/1900 | Harry | F16K 31/26 137/122 |
| 1,124,458 | A | * | 1/1915 | Kessler | F16K 31/26 137/122 |
| 1,312,738 | A | * | 8/1919 | Lear | E03B 3/02 137/122 |
| 1,950,682 | A | * | 3/1934 | Malsbary | B67C 11/02 119/14.18 |
| 4,495,960 | A | * | 1/1985 | Cartier | D06F 39/08 137/122 |
| 5,290,434 | A | * | 3/1994 | Richard | B01D 21/2444 137/398 |

(Continued)

*Primary Examiner* — Benjamin F Fiorello
(74) *Attorney, Agent, or Firm* — David B. Waller (57) ABSTRACT

The device herein disclosed and described provides a water collection system that separates the initial flush of rainwater, which contains higher concentrations of undesirable contaminants from later received rainwater having lower concentrations of contaminants to be stored for later use or to be discharged directly to receiving bodies of water. The device contains a cistern for treating first flush rainwater, a basin for receiving water in fluid connection with the cistern and a water storage tank, a water diversion channel that diverts first flush rain water to the cistern and additional rainwater to a water storage tank, a floatation device on a connecting rod affixed to the diversion channel that acts to operate the diversion channel when the water in the cistern achieves a desired height by diverting the additional water received to the water storage tank.

12 Claims, 4 Drawing Sheets

(56) References Cited

U.S. PATENT DOCUMENTS

| | | | | |
|---|---|---|---|---|
| 5,433,845 | A * | 7/1995 | Greene | B01D 17/0208 137/561 A |
| 6,182,680 | B1 * | 2/2001 | Hart | E03B 3/03 137/122 |
| 7,163,635 | B2 * | 1/2007 | Fitzgerald | E03F 1/00 210/162 |
| 2002/0056475 | A1 * | 5/2002 | Doiron | E03B 3/02 137/122 |
| 2005/0025573 | A1 * | 2/2005 | Waldman | E02B 13/02 405/41 |
| 2005/0081926 | A1 * | 4/2005 | Wade | E03B 3/02 137/593 |
| 2005/0082211 | A1 * | 4/2005 | Wade | B01D 21/02 210/154 |
| 2011/0076101 | A1 * | 3/2011 | Moody | E03F 5/107 405/96 |
| 2011/0176869 | A1 * | 7/2011 | Moody | E03F 5/107 405/96 |
| 2013/0118963 | A1 * | 5/2013 | Bailey | E03F 5/0404 210/164 |
| 2016/0348502 | A1 * | 12/2016 | Kim | G08C 17/00 |

\* cited by examiner

TILT DIVERTER TO CONTROL STORM-WATER

CROSS-REFERENCE TO RELATED APPLICATIONS

Not applicable.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

TECHNICAL FIELD

The present invention relates generally to devices that may be utilized to separate initial rainwater runoff from surfaces, such as driveways, parking lots, playgrounds, shipping containers storage yards, patios, roofs, freeways and roads that may be considered to be contaminated or polluted, from entering storm drains. More specifically, tilt diverters that dispense a particularly desired volume of water flowing from surfaces at the early stages of rainfall or other water event to a more desirable location for absorption into the ground or soil so that it does not enter a storm drain untreated.

BACKGROUND OF THE INVENTION

Current State and Federal regulations requires that first flush rainwater, which is normally polluted, is to be treated prior to discharging it into the storm drain or infiltrating it into the ground depending on the infiltration capacity of the soil and/or the depth of the existing water table. The rest of the rainwater after the first flush may be discharged into a storage tank or directly into the receiving bodies of water such as the river or ocean. The first flush is transferred to a reservoir that is either above or below ground. Such a reservoir is designed to receive the first flush that has been pre-treated, meaning removed of solids and floatables. Pre-treatment minimizes the accumulation of such objects in the reservoir thereby minimizing the difficult and costly maintenance, especially for underground reservoirs.

In most cases, the approving authorities allow the rest of the rainwater after the first flush to continue to drain into the first flush container exceeding its designed capacity and then made to overflow into the storm drain. This defeats the purpose of separating the first flush from the rest of the clean rainwater.

Some inventions use electronics to control the volume of first flush received by the reservoir. But when there is power outage or electronic failure these systems can fail. In many areas where such a system would be beneficial, including lesser developed countries, power outages can occur from storm conditions with heavy rainfall or more aggressive environmental events such as typhoons. In addition, the complexity of some of these systems can make them difficult or impossible to repair if damaged.

Energy conservation and environmental preservation are present day concerns and therefore the use of electrical power or electronic parts should be minimized or not used at all due to the burning of fossil fuel related to power generation including the manufacture of electronic components and solar panels.

As such, there is a continuing unmet need for a water management system that utilizes a simple mechanical mechanism for diverting first flush rainwater to a holding reservoir or cistern for treatment while allowing the remaining rainwater to be shuttled to a water storage tank for later use or directly to receiving bodies of water.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a water collection system that separates the initial flush of rainwater which contains higher concentrations of undesirable contaminants from later received rainwater having lower concentrations of contaminants which may be stored for later use. The device contains a cistern, a basin, a water diversion channel, a connecting rod and floatation device. The cistern is a treatment reservoir to which the first flush rainwater is diverted for treatment or ground infiltration. The basin having sidewalls and a top wall able to receive a grate and/or optional stub pipe(s) in fluid connection with the cistern and a water storage tank, wherein the basin has a raised wall partition within. The water diversion channel having a base and sidewalls is pivotally connected about the middle of its base or sidewalls to the basin side walls or to the raised wall partition and positioned such that when tilted, one end of the water diversion channel contacts the top of the partition wall or a stop within the basin sidewalls to a desired angle for dispensing water. The rod has a first and second ends. The first end is connected to the base of one end of the water diversion channel and extends into and is in fluid connection with the cistern. The flotation device is adjustably connected to the second end of the rod and able to interact with water collected in the cistern such that when first flush rainwater is received by the basin the water diversion channel diverts water into the cistern and when the water in the cistern raises to a pre-determined level, the flotation device in turn pivots the water diversion channel by the rod thereby diverting clean water to the storage tank or receiving bodies of water.

Another aspect of the present invention is a water collection system comprising a chamber divided into a basin compartment and a cistern, a water diversion channel, a connecting rod and a floatation device. The chamber comprises a basin compartment and a cistern with a single or multiple compartments. The basin compartment having a top grate, with or without a common wall with the cistern, positioned over or away from the cistern but in fluid connection with the cistern. The basin compartment has a raised wall partition within and is in fluid connection with a water storage tank. The water diversion channel is pivotally connected about the middle of its base to the sides of the basin compartment or to the raised wall partition and positioned such that when tilted dispenses water into either the cistern or the water storage tank. The connecting rod has a first end and a second end. The first end is connected to the base of one end of the water diversion channel and is in fluid connection with the cistern. The flotation device is adjustably connected to the second end of the connecting rod and able to interact with fluid collected in the cistern such that when water is received by the basin compartment the water diversion channel diverts water into the cistern until the rising water raises the flotation device that in turn pivots the water diversion channel by the connecting rod thereby diverting clean water to the water storage tank or receiving bodies of water.

Another aspect of the invention is that it can function without the use electrical power and related wirings and electronic components.

In one embodiment, the system further comprises means for directing water to the water diversion channel. This means for directing water may be a gutter, a gutter downspout, a pipe or drain. In another embodiment, the flotation device housing further comprises grooves on its sides which serve as guides for the upward and downward mobility of the flotation device during use. In yet another embodiment, the system further comprises a grate on the top wall of the basin. This grate may further comprise a filter. In still another embodiment, the flotation device is provided in a cylindrical or spherical shape or an oval or egg shape. In another embodiment, the flotation device has an aperture through its center for receiving the connecting rod and this aperture may be threaded.

Yet another aspect of the present invention is a water collection system comprising a rain water receiving chamber, water diverting platform, connecting rod and float. The rainwater receiving chamber having sidewalls, a top, a plurality of inlets for receiving rainwater, a base, a first outlet to a cistern oriented parallel to and in line with said sidewalls extending through said base, and a second outlet to a water storage tank oriented perpendicular to said side walls. The top is able to receive a grate. The base having a wall partition extending perpendicular from the base. Both the cistern and water storage tank are in fluid connection with the rainwater receiving chamber. The water diverting platform having a size and shape that is about the size and shape of a cross-section of the rainwater receiving chamber and the water diverting platform may be slidably affixed on the wall partition such that when tilted, rainwater received can be diverted to either the cistern or the water storage tank. The connecting rod having a first end, a second end and a hinge positioned closer to the second end. The first end of the connecting rod is affixed to the base and near one edge of the water diverting platform. The float is adjustably connected to the second end of the connecting rod within the first outlet and able to interact with rainwater collected in the cistern such that when rainwater is received by the rainwater receiving chamber, the water diverting platform diverts water into the cistern until a determined volume is collected. The rising water at a pre-determined volume raises the float which in turn pivots the water diverting platform by action of the rod thereby diverting additional rainwater to the water storage tank or receiving bodies of water.

In one embodiment of this aspect of the invention, the first outlet may further comprise grooves oriented parallel to the cistern outlet and the float may further comprise fins that are received by these grooves to maintain the orientation of the float during operation. In another embodiment the water collection system may further comprise a grate on the top wall of said basin and the grate may further comprise a filter.

In yet another embodiment, the float may be provided in a cylindrical shape, may have an aperture through its center for receiving the connecting rod and this aperture may be threaded.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

The objects, features, and advantages of the invention will be brought out in the following part of the specification, wherein detailed description is for the purpose of fully disclosing the invention without placing limitations thereon.

DETAILED DESCRIPTION OF THE INVENTION

Definitions

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

The term "affixed" or "connected" as used herein refers to any method know to those skilled in the art to connect one element of the invention to another element of the invention, while taking into consideration how the two elements will operate when connected together. For example, if element one is to be able to pivot about element two then one skilled in the art may consider that the two elements are affixed by a hinge or other connectivity that would provide element one the ability to pivot about element two. If the two elements are to be secured so that there is no movement between the elements, then one skilled in the art might consider a more permanent method of affixing the two elements such as welding, brazing, soldering, adhesive, nut and bolt, screw, nail or the like.

The term "basin" as used herein refers to a container or reservoir that typically has a base and sidewalls with an open top. This can also include an enclosed chamber having a large opening for receiving, for example, water or liquid. This opening does not have to be completely free of structural elements and could for example, be covered by a grate. A basin as used herein does not exclude for example a reservoir having multiple inlets for receiving water and/or outlets for diverting water received to other reservoirs, tanks or chambers.

The term "first flush rainwater" as used herein refers to rainwater that runs off of a surface that has not been cleaned since the last rain. These surfaces can include large areas such as freeways, highways and roads, airplane runways and sidewalks or could include smaller areas such as commercial and residential roofs, cars, recreational areas such as tennis courts and basketball courts. During times of the year when rain does not fall regularly, these areas collect contaminants such as dust, dirt, animal and bird droppings, atmospheric debris, plant material, oil, rubber and fuel. During the first rains of a season, rain mixes with these contaminants producing first flush rainwater. While this term is directed specifically, to "rainwater", there are events in which water becomes contaminated similarly and should be treated. These include for example washing a car, pressure spraywashing a house before painting and cleaning a driveway. These can also be considered "first flush" water.

The term "flotation device" as used herein refers to any method known to those skilled in the art for utilizing a float and float mechanism to initiate a mechanical event based on the physical action of the density of water exerting pressure on an enclosed chamber containing air or gas submerged in water. For example, a toilet uses a float ball on the end of a lift rod to close a water inlet valve that fills the water tank when the water in the tank reaches the desired level.

The term "compartment" and/or "chamber" as used herein refers to any enclosed area having a top, a bottom and sidewalls. This includes compartments and/or chambers having one or more inlets for receiving a fluid and/or one or more outlets for dispensing the fluid received by the compartment or chamber.

The term "water diverting platform" as used herein refers to a type of valve that utilizes a pivotal planer surface as a method of diverting fluid or water from one location to another. In the present invention, there are two fluid connections, one to a cistern and one to a water storage tank, positioned below the water diverting platform. When the platform is pivoted it can direct water received by the device to a cistern during the initial stages of operation and then to the water storage tank after a determined amount of rainwater has been collected in the cistern.

The term "water diverting channel" as used herein refers is similar to the water diverting platform but instead of using a platform to direct fluid from one location to another, this water diverter utilizes a trough or channel or conduit.

The device herein disclosed and described provides a water collection system that separates the initial flush of rainwater which contains higher concentrations of undesirable contaminants from later received rainwater having lower concentrations of contaminants which may be stored for later use. The device may comprise a cistern and/or a water storage tank or may merely be in fluid contact with such reservoirs, a basin for receiving rainwater, a water diverting mechanism that directs first flush rain water to the cistern and later received water to the water storage tank (i.e., a water diversion channel or water diverting platform), a connecting rod and float or other floatation device. The cistern is a treatment reservoir to which the first flush rainwater is diverted for treatment or ground infiltration. The basin having sidewalls and a top able to receive a grate and/or optional stub pipe(s) in liquid connection with the cistern and a water storage tank and a raised wall partition within. The basin may have one or more inlets for receiving rainwater through the top or sidewalls and one or more outlets in the sidewalls for dispensing water. The water diverting mechanism may be a channel having a base and sidewalls pivotally connected about the middle of its base or sidewalls to the basin side walls or to the raised wall partition and positioned such that when tilted, one end of the water diversion channel contacts a stop within the basin sidewall to a desired angle for dispensing water from the other end of the channel. Alternatively, the water diverting mechanism may be a platform pivotally connected to the raised wall partition. The rod has a first and second ends and may also have a hinge along its length. The first end is connected to the base of one end of the water diverting mechanism and extends into and is in liquid connection with the cistern. The flotation device is adjustably connected to the second end of the rod and able to interact with liquid collected in the cistern such that when first flush rainwater is received by the basin the water diverting mechanism diverts water into the cistern and when the water in the cistern raises to a pre-determined level, the flotation device in turn pivots the water diverting mechanism by the rod thereby diverting clean water to the storage tank.

The Cistern and Water Storage Tank

The present invention may be provided in a variety of configurations, In one configuration 10 the cistern 12 is included as an element of the water collection system (see FIG. 1) and the water storage tank 26 is separate from, but in fluid communication with, the water collection system. In other configurations, both the cistern 12 and the water storage tank 26 are separate from, but in fluid communication with, the water collection system (see FIGS. 2-4). When the cistern 12 is an element of the system, the basin 14 that receives the water directing it to the water diversion channel 28 is positioned above the cistern 12. The basin 14 is separate from the cistern 12 but in fluid communication with the cistern 12. The size of the cistern 12 to be utilized with the present system will depending on the geographical location, the surface area from which first flush volumes of water will be received from, the amount desired to be rinsed from these surfaces before the remaining water is considered clean enough and the coefficient of re-adsorption if the cistern is one that directs first flush water to the ground for resorption among other considerations. One skilled in the art, with this and other information, which may be specific to a particular cite, can make calculations that will determine the volume required for that particular location. A number of different types of cisterns may be utilized with the present invention and one skilled in the art would be able to determine which type would be best for use in a particular region or location.

The water storage tank 26 may be close to, or distant from, the water collection system and/or the cistern 12. A variety of water storage tanks 26 may be utilized with the present invention. The size of the tank or tanks 26 to be utilized for water storage can be determined by those skilled in the art using similar types of calculations as those used to determine the size of the cistern 12 in order to optimize the amount of water retained for future use based on location.

Figure 4:
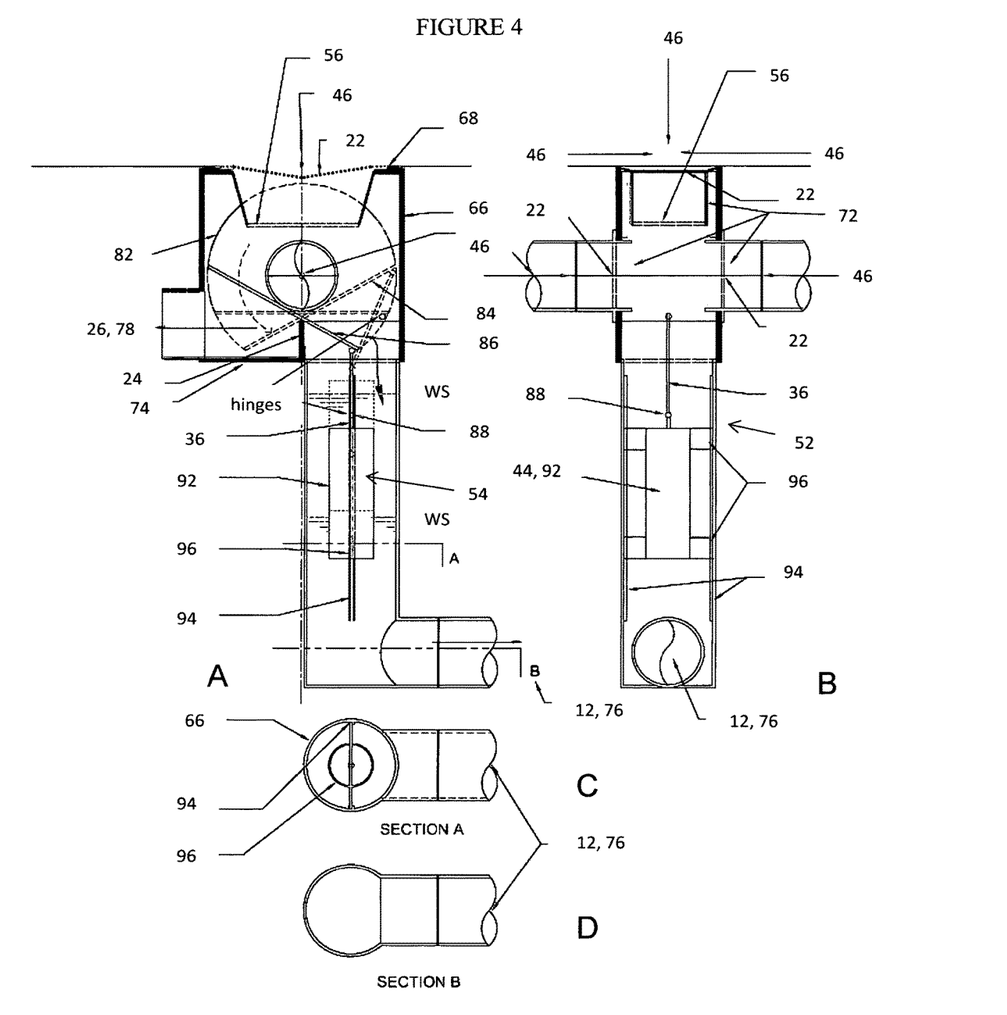
FIG. 4 shows another embodiment of the present invention similar to FIG. 2 having a plurality of inlets for receiving rainwater.

In one configuration, the basin and cistern form a rainwater receiving chamber 64 having sidewalls 66, a top 68, a plurality of inlets 72, a base 74, a first outlet 76 to the cistern 12 and a second outlet 78 to the water storage tank 26 (see FIG. 4).

The Basin

The basin 14 is the water collection system's receiving portal for rainwater. The basin 14 is the housing in which the water diversion device, the connecting rod 36 and the floatation device 44 reside and operate. The basin 14 has a top 18, sidewalls 16 and a base. The top 18 is configured so that it may receive a grate 22. The grate 22 may be removable and may further comprise a filter 56 that may be replaced on a regular basis. The structural configuration of the grating may be to exclude larger materials such as leaves or may be finer to exclude items of a particular size, for example, the grate may have a grid to exclude items of greater that one centimeter or items as small as 3 millimeters. One skilled in the art can make a determination of the desired particle exclusion size for the grate in view of the desired or required flow rate to assure that under regular or anticipated rain fall that the basin does not overflow. Filters with a slower permeability for water may be used with reduced rainfall to exclude particulates of significantly smaller size than 3 millimeters. As stated above, one skilled in the art would be able to determine based on the required flow rate and the volume of water being services by the basin 14 at a given time, whether a particular permeable filter 56 would be better to use than another.

The base of the basin 14 will have an outlet which extends, generally parallel and in line with the sidewalls 16, that directs first flush rainwater to the cistern 12 for readsorption or for treatment. This outlet may be provided in a variety of lengths and houses the connecting rod 36 and float of the floatation device 44 (see FIG. 4). The base also provides a raised wall partition 24 about its middle for affixing of the water diverting mechanism. This partition 24 may be formed independently within the base of the basin or may be constructed from or integral to the cistern outlet as shown in FIG. 4. In line with, or just slightly above the base of the basin 14 is an outlet to a water storage tank 26. In one configuration, the outlet for the water storage tank 26 in the sidewall of the basin 16 is opposite the outlet for the cistern 12 in the base of the basin 14. The basin 14 may also have additional inlets for receiving water from other areas that cannot be directed through the top of the basin 14. If this is the case, these inlets are positioned above the base, oriented perpendicular to the outlets for the cistern 12 and water storage tank 26 and perched with their base close to, or just above the raised wall partition 24, so that water received from these inlets can be diverted by the water diverting mechanism with the other sources of water into the cistern 12 or water storage tank 26 simultaneously.

The Water Diverting Mechanism

Figure 1:
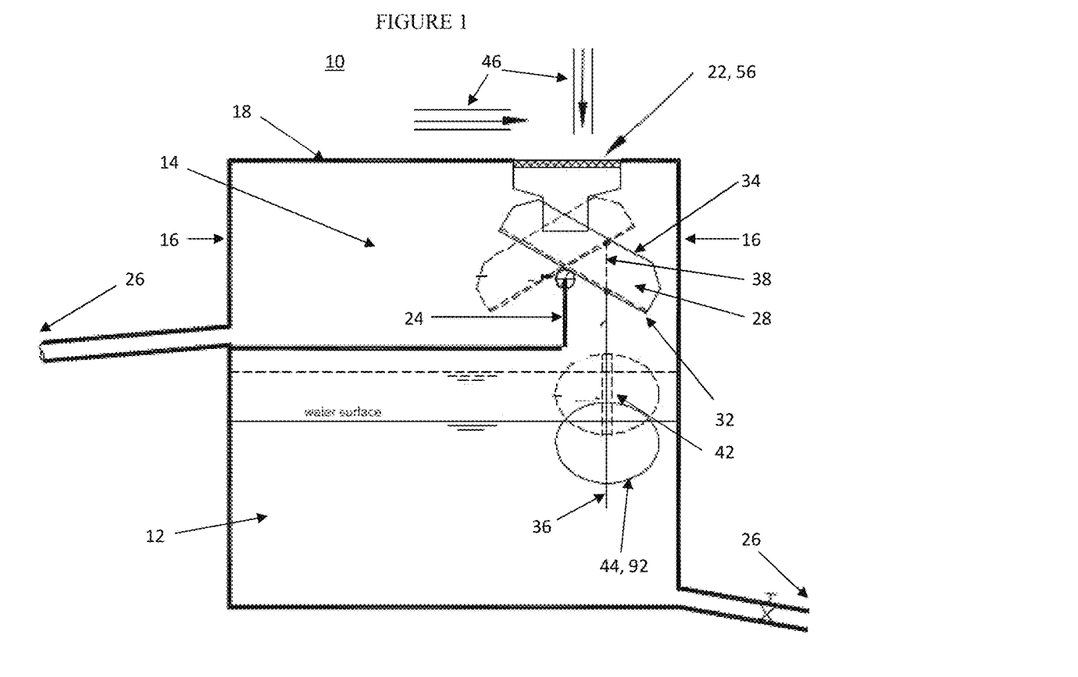
FIG. 1 shows one embodiment of the present invention wherein the water collection system comprises a cistern to collect the first flush rainwater, and after collecting the desired amount of first flush rainwater, diverts the remaining rainwater collected to a rainwater storage tank.
Figure 2:
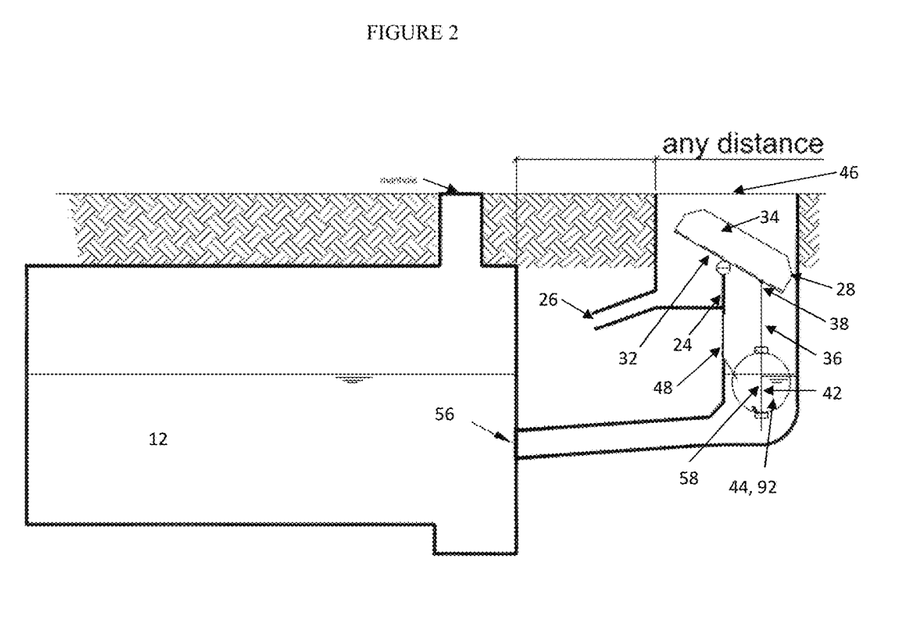
FIG. 2 shows another embodiment of the present invention wherein the water collection system is separate from, but in fluid connection with, the cistern and rainwater storage tank such that when the desired amount of first flush rainwater is collected into the cistern, the remaining rainwater is diverted to a water storage tank.
Figure 3:
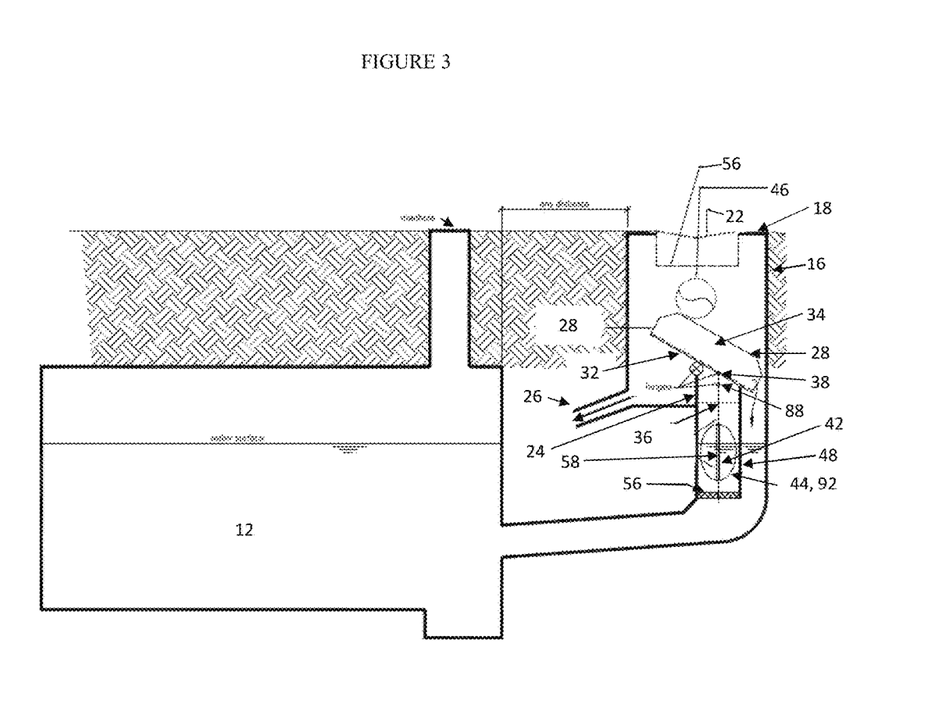
FIG. 3 shows another embodiment of the present invention similar to FIG. 2 wherein the water collection system is separate from, but in fluid connection with, the cistern and rainwater storage tank such that when the desired amount of first flush rainwater is collected in the cistern, the remaining rainwater is diverted to a water storage tank. However, in this configuration, the connecting rod and float, also referred to as the floatation device, are housed in a separate chamber that is in fluid connection with the cistern.

The water diverting mechanism is a means for utilizing the buoyancy of a float connected to a rod that activates or pivots a platform or channel thereby diverting rainwater from one outlet (i.e., the cistern 12 outlet) to a second outlet (i.e., the water storage tank 26 outlet) when the first reservoir reaches a pre-determined level exerting pressure on the float, raising the rod and pivoting the platform or channel. A variety of configurations may be utilized to accomplish this operation. Two water diverting mechanisms are shown in the figures. More specifically, FIGS. 1 through 3 show a water diverting channel 28 and FIG. 4 shows a water diverting platform 82. These are only two configurations, one skilled in the art could imagine other similar methods for preparing the water diverting means that are within the scope of this invention.

FIGS. 1, 2 and 3 show a configuration wherein the water diverting mechanism utilizes a channel or trough 28 that is positioned within the basin 14 on a pivotal connection to a raised wall partition 24 or to the sides of the basin 16. In one embodiment, this connection is merely a two piece pivotal connector comprising a pin and a tube for receiving the pin. This tube is affixed about the middle of the base of the channel or trough 32 oriented perpendicular to the flow of the channel or trough 28. The pin that is received by the tube is affixed by its ends to the raised wall partition 24 or to the sides of the basin 16. Those skilled in the art recognize that the tube may be affixed to the channel or trough 28 or to the raised wall partition 24 and the pin may be affixed to the base of the channel or trough 32. Further, the pin may be a single rigid shaft that runs through the full length or about the full length of the tube or it may be provided in a two part configuration wherein one portion of the pin fits within one end of the tube and the other portion of the pin fits within the other end of the tube. For example, the pin may be prepared in the shape of a rectangle wherein the ends are oriented toward each other but do not touch or are positioned a desired distance apart from each other. In this configuration the longer length side of the rectangle is affixed to the base and about the middle of the base of the channel or trough 32 allowing the ends to extend downward from the base of the channel or trough 32, one end being inserted into one end of the tube and the other end being inserted into the second end of the tube creating a pivotal connection.

In other configurations, the pivotal elements that allow the channel or trough 28 to pivot do not have to be on the base of the channel or trough 32; they may also be positioned on the sides of the channel or trough 34.

FIG. 4 shows a configuration wherein the water diverting mechanism utilizes a platform 82 that is positioned within the basin 14 on a sliding pivotal connection to a raised wall partition 24. The sliding pivotal connection may also be provided in the walls of the basin 16. In such a configuration, the basin 14 would preferably have sidewalls 16 formed in a square or rectangle. The sliding pivotal connection allows the platform or butterfly valve 82 to, not only pivot about an axis oriented about the middle and along the base of the platform or butterfly valve 84, but will also allow the platform or butterfly valve 82 to slide perpendicular to that pivotal axis. A variety of methods known to those in the art to create this connection may be utilized. For example, if the platform or butterfly valve 82 was square or rectangular in shape, then such a sliding pivotal connection could be provided by having enclosed elongated oval guides on either side of the platform or butterfly valve base 84 able to receive guide pins extending from either side of the basin 14 or receive a single pin that is affixed to and extends across the basin 14. Alternatively, the guide may be provided in or on the basin wall 16 and the pin or pins affixed to the base of the platform or butterfly valve 84. Further the guides and/or pin or pins are not required to be affixed to the base of the platform or butterfly valve 84; they may also be affixed to the upper surface of the platform or butterfly valve 86.

If the platform or butterfly valve 82 were circular in shape, then the base may be provided with an enclosed elongated oval guide about the middle and along a diameter of the base able to receive a pin affixed to and extending from one side to the other of the basin 16 and perpendicular to the enclosed elongated oval guide. Further the guide is not required to be affixed to the base of the platform or butterfly valve 84, it may also be affixed to the upper surface of the platform or butterfly valve 86.

In other configurations, the guide does not have to be a closed elongated oval shape, it may be provided in an open hook shaped configuration.

The Connecting Rod

The connecting rod 36 is made of an elongated rigid material that is resistant to flexing and deterioration and expansion due to regular contact with water. The rod 36 acts as a lifting apparatus to raise or lower one end of the water diverting means 28, 82 allowing water to be directed to either a cistern 12 or water storage tank 26 during use as desired. In this regard, one end of the connecting rod 36 is rotatably affixed to one end of the channel or trough 28 or along the perimeter edge of the platform or butterfly valve 82 at a position perpendicular to the sliding pivotal connection. The other end is connected to a float 44, 92 that provides the lifting energy when it is in contact with water.

When the sliding pivotal water diverting mechanism 82 is used and the connection to the float 92 is static, the connecting rod 36 may further include a hinge 88 near the float 92. This will allow the sliding capability of the sliding pivotal connection to move easily without resistance that would result if the connecting rod 36 were rigid. In one embodiment, one end of the connecting rod 36 is rotatably affixed to the platform or butterfly valve 82 and the other end is provided in a threaded configuration to receive the float 92. This allows the user to adjust the distance the float 92 is positioned from the water diverting means and determine the amount of first flush water to be retained by the cistern 12 before the water is redirected to the water storage tank 26. In this configuration, the connecting rod 36 will have a pivotal or rotatable hinge 88 that allows the rod 36 to rise at an angle other than 90 degrees without exerting force on the connection between the connecting rod 36 and the float 92. Depending on the length of the cistern outlet, this hinge 88 may be positioned closer to the middle of the length of the rod 36 or closer to the float 92. One skilled in the art would be able to make this determination once the distance from the float 92 to the basin 14 is determined for the desired operation.

The Floatation Device

The floatation device 44 is merely an air or gas filled container with generally rigid walls that when placed in contact with water maintains its buoyancy and able to rise with the level of the water as well as act as a counter weight maintaining the channel or trough 28, platform or butterfly valve 82 in its initial position directing first flush water to the cistern 12. The float 92 may have a variety of shapes. In one embodiment, the float 92 is provided in an elongated configuration with an aperture through its center 58 to receive the connecting rod 36. The float 92 may be statically affixed to the connecting rod 36 by a variety of methods such as by adhesive or bolt. Alternatively, the float 92 may be connected to the connecting rod 36 in a manner that allows the float position to be adjusted thereby regulating how much water is diverted to the cistern 12 before being diverted to the water storage tank 26. In another embodiment, the ability of the float 92 to rotate is restricted by providing guides 96 along the interior of the cistern 12 outlet which engage the exterior of the float 92 maintaining the float's position during use. For example, the float 92 could have one or more fins 96 along its exterior that fit into one or more grooves 94 provided in the walls of the cistern 12 outlet. IN another configuration the flotation device comprises a cylindrical sleeve 48 having vertical guide rails 52 and the float 92 has grooves 54 that receive the vertical guide rails 52 of the cylindrical sleeve 48 maintaining the orientation of the float 92 during use.

The amount of pressure needed to exert the desired force to lift the channel or trough 28, platform or butterfly valve 82 can be determined based on the anticipated volume (i.e., weight) of water to be received by the channel or trough 28, platform or butterfly valve 82 during a rain. Since this volume may vary depending on the season, the force needed should be estimated for high water volume events to assure adequate operation during these times. One skilled in the art can determine the amount of buoyancy required to lift a specific amount of water during high volume events mathematically or can make this determination by performing simple experiments. These experiments can be conducted in a water tank by placing certain defined weights on a float and determining the float's ability to stay above the level of the water.

Make and Use

The device of FIG. 1 may be prepared, inserted into the ground at a desired location such that the inlets are able to easily reach the basin and connected to a water storage tank. Prior to use the float is positioned on the connecting rod at a distance that will assure that the rising level of the water in the cistern is able to lift the rod and correspondingly the channel or trough, platform or butterfly valve based on a specified and anticipated volume during a heavy rain or large water volume event. Water source connections are directed to the basin. These could include down spouts from a roof gutter system and/or surface run off pipes or gutters from a garden or sidewalk. During a rain the first flush amounts of water received by the water collection system are directed to the cistern with the float acting as a counterweight to maintain the channel or trough, platform or butterfly valve directing water to the cistern. As the water in the cistern rises, it contacts the float which maintains its buoyancy thereby raising the connecting rod which in turn lifts the channel or through, platform or butterfly valve until water is diverted into the water storage tank.

The device of FIGS. 2 through 4 can be connected to an existing cistern and water storage tank or they can be provided with the water collection system. If provided, these reservoirs are buried in the ground or positioned at a lower level that the basin. The basin is positioned to receive water from the desired source. The system works similarly to that described in FIG. 1. However in this case, when the level of the water in the cistern reaches the desired level, the float rises lifting the connecting rod. The end of the connecting rod on the platform or butterfly valve rotates while lifting the platform or butterfly valve. The platform or butterfly valve is raised on one side, sliding along the guides while simultaneously pivoting on the raised wall partition. The connecting rod pivots about its hinge allowing the side movement of the platform or butterfly valve along its guides. This in turn raises the end of the platform or butterfly valve that is positioned over the cistern outlet and lowers the end of the platform over the water storage tank outlet redirecting the for storage after the desired amount of first flush water is diverted to the cistern.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

To prevent the aforementioned drawbacks, this invention uses the rise and fall of the water in the first flush container to control the amount of water that is drained into it.

At initial stage prior to the rain, the diverter channel is tilted to drain rainwater towards the first flush container. The first flush rainwater has to be pre-treated before it reaches the diverter channel. As the first flush container fills to a pre-determined level, the float rises and pushes the diverter channel to tilt down in the other direction to divert the rest of the (clean) rainwater away from the first flush container and to the storm drain or another container for other uses.

Depending on the soil characteristics and the depth of water table, the water in the first flush container maybe allowed to recharge the underground water. In such a case, the bottom first flush container is unlined to allow water to percolate. When the soil has been saturated and can no longer absorb additional water, the water level rises to the pre-determined level. And the float rises to function as above.

When water in the first flush container has receded or has been drained to a pre-determined level, the float goes down and pulls the diverter channel back to its initial stage ready for the next rain event.

Due to the absence of electrical or electronic components, maintenance does not require specialized skills.

It should be obvious that there will be variations and modifications within the scope in the above-discussed embodiment of this present invention.

We claim:

1. A water collection system comprising:
   a cistern or treatment reservoir to catch first flush rainwater collected for infiltration into the ground or for treatment;
   a basin having sidewalls and a top, said top able to receive a grate and/or optional stub pipe(s) in liquid connection with said cistern or treatment reservoir for receiving first flush rainwater to be collected, wherein said basin has a raised wall partition within and wherein said basin is in liquid connection with a water storage tank;
   a water diversion channel having a base and sidewalls, wherein said water diversion channel is pivotally connected about the middle of its base or sidewalls to said basin sidewalls or to said raised wall partition and positioned such that when tilted one end of said water diversion channel contacts the top of said raised wall partition or a stop within said basin sidewalls to a desired angle for dispensing water;
   a connecting rod having a first end and a second end, said first end affixed to said base of said water diversion channel on one end, wherein said rod extends into and is in liquid connection with said cistern or said treatment reservoir; and
   a flotation device adjustably connected to said second end of said connecting rod and able to interact with rainwater collected in said cistern or said treatment reservoir such that when first flush rainwater is received by said basin, said water diversion channel diverts water into said cistern or treatment reservoir, wherein the rising water at a pre-determined level raises said flotation device which in turn pivots said water diversion channel by said rod thereby diverting clean water to said water storage tank,
   wherein said flotation device is housed in a cylindrical sleeve in fluid connection with said cistern, wherein said cylindrical sleeve has vertical guide rails and wherein said floatation device further comprises grooves that interface with said vertical guide rails guiding the upward and downward mobility of said floatation device during use.

2. The water collection system according to claim 1, wherein said system further comprises means for directing water to said water diversion channel.

3. The water collecting system according to claim 2, wherein said means for directing water is a gutter, gutter downspout, pipe or drain.

4. The water collecting system according to claim 3, further comprising a grate on said top of said basin.

5. The water collecting system according to claim 4, wherein said grate further comprises a filter.

6. The water collecting system according to claim 1, wherein said flotation device is provided in a cylindrical or spherical shape or an oval or egg shape.

7. The water collecting system according to claim 1, wherein said flotation device has an aperture through its center for receiving said connecting rod.

8. A water collection system comprising:
   a rainwater receiving chamber having sidewalls, said sidewalls having a top, a plurality of inlets for receiving rainwater, a base, a first outlet to a cistern oriented parallel to and in line with said sidewalls extending through said base, and a second outlet to a water storage tank oriented perpendicular to said side walls, said top able to receive a grate, said base having a raised wall partition extending perpendicular from said base, said cistern and water storage tank in fluid connection with said rainwater receiving chamber;
   a water diverting platform having a size and shape about the size and shape of a cross-section of said rainwater receiving chamber, said water diverting platform slidably affixed on said raised wall partition within said rainwater receiving chamber such that when tilted rainwater received by said rainwater receiving chamber can be diverted to either said cistern or said water storage tank;
   a connecting rod having a first end, a second end and a hinge, wherein said hinge is positioned closer to said second end, said first end affixed to the base and near one edge of said water diverting platform; and
   a float adjustably connected to said second end of said connecting rod within said first outlet and able to interact with rainwater collected in said cistern such that when rainwater is received by said rainwater receiving chamber said water diverting platform diverts water into said cistern until a determined volume is collected, wherein the rising water at a pre-determined volume raises said float which in turn pivots said water diverting platform by said rod thereby diverting additional rainwater to said water storage tank, wherein said first outlet further comprises grooves oriented parallel to the cistern outlet and further wherein said float comprises fins that are received by said grooves to maintain the orientation of the float during operation.

9. The water collecting system according to claim 8, further comprising a grate on the top wall of said basin.

10. The water collecting system according to claim 9, wherein said grate further comprises a filter.

11. The water collecting system according to claim 8, wherein said flotation device is provided in a cylindrical shape.

12. The water collecting system according to claim 8, wherein said flotation device has an aperture through its center for receiving said connecting rod.

* * * * *